United States Patent [19]

Hoffmann et al.

[11] 3,832,581

[45] Aug. 27, 1974

[54] MULTI-ARMATURE AND CONCENTRIC MOTORS

[76] Inventors: George R. Hoffmann, P.O. 8201 Craig, Overland Park, Kans. 66204; Elmer B. Mason, P.O. 901 Vickie Dr., Oklahoma City, Okla. 73115; Graydon W. Jack, P.O. 2532 N.W. 28th, Oklahoma City, Okla.; Glenn A. Campbell, Montrose, Mo. 64770

[22] Filed: Mar. 31, 1972

[21] Appl. No.: 240,148

[52] U.S. Cl................................. 310/46, 310/268
[51] Int. Cl. ........................................ H02k 21/38
[58] Field of Search ....... 310/40, 46, 156, 268, 152; 318/138, 254

[56] References Cited
UNITED STATES PATENTS

| | | | |
|---|---|---|---|
| 1,863,294 | 6/1932 | Bogia | 310/46 |
| 1,946,289 | 2/1934 | Lilienthal et al. | 310/268 X |
| 2,806,158 | 9/1957 | Emery et al. | 310/268 |
| 2,993,159 | 7/1961 | Devol | 318/254 |

Primary Examiner—D. F. Duggan
Attorney, Agent, or Firm—Schmidt, Johnson, Hovey & Williams

[57] ABSTRACT

Electric motors of multi-armature and concentric design having high efficiency and special operating characteristics adapting the motors for a number of different types of applications. The multi-armature design employs two or more armatures and a common source of magnetic excitation, parallel magnetic circuits being established through the armatures to independently excite the same. In the two armature version, parallel connection of the armatures and the excitation winding causes the motor to have a dual operating characteristic in that the speed of one armature varies inversely with the speed of the other armature, and vice versa, until the higher speed armature reaches a critical rpm, whereupon the load may be increased over a wide range without further changes in the speed of either armature.

8 Claims, 18 Drawing Figures

MULTI-ARMATURE AND CONCENTRIC MOTORS

This invention relates to improvements in electric motors and, more particularly, to motors having increased efficiency and special operating characteristics adapting the motors for a variety of applications.

An important object of the present invention is to provide a high efficiency, multi-armature electric motor in which bulky and complicated field windings are eliminated, and wherein the design provides a compact and relatively flat configuration.

Another important object of the invention is to provide a multi-armature motor as aforesaid in which the speed of one armature varies inversely with the speed of another armature, and vice versa, over a given operating range of the machine.

Another important object of the invention is to provide such a multi-armature motor having the aforesaid characteristic which, in addition, operates at constant armature speeds over a wide range once the higher speed armature or armatures reaches a critical rpm.

Still another important object of this invention is to provide a multi-armature motor which may be connected with a common field in a compound manner to provide both high starting torque and constant speed characteristics throughout a wide range of load variations.

A further and important object of the invention is to provide a multi-armature motor as aforesaid which may be stacked in multiples or banks in building block fashion in order to particularly adapt the motor for complex control system applications.

In addition to the foregoing, it is an important object of the present invention to provide a synchronous motor of concentric rotor-stator configuration having a very high efficiency rating superior to conventional synchronous and squirrel cage motor designs.

Another important object of the invention is to provide a synchronous motor as aforesaid having the attribute of simplified construction and the capability of exactly synchronous operation independent of supply voltage variations.

Still another important object of the invention is to provide an improved synchronous motor as aforesaid which may be advantageously arranged in multiple sections to provide an integrated motor configuration of correspondingly increased power.

Yet another important object is to provide an improved synchronous motor as aforesaid in which either of the two reacting parts of the machine may be employed as the rotating part.

A further and important aim of the present invention is to provide an electric motor configuration having increased torque over a greater speed range than obtainable with conventional designs, yet without altering the basic motor construction.

As a corollary to the foregoing aim, it is an important object of this invention to provide a motor in which the outer, excitation-producing part is permitted to rotate while the inner part is maintained stationary, a rotative drive connection being effected between the rotating outer part and the load.

In this respect, another important object is to provide a multiple electric motor drive assembly in which the individual motors thereof comprise motors having outer rotating parts.

Other objects will be apparent as the detailed description proceeds.

FIGS. 1–7

Figure 1:
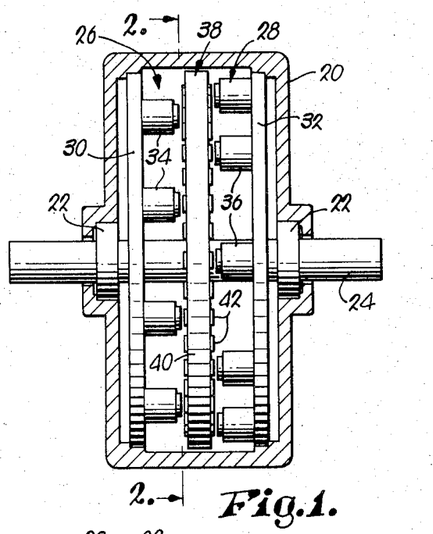
FIG. 1 is a cross-sectional view through the housing of the synchronous motor of the present invention, the rotor unit, field assemblies, and shaft being shown in elevation.
Figure 2:
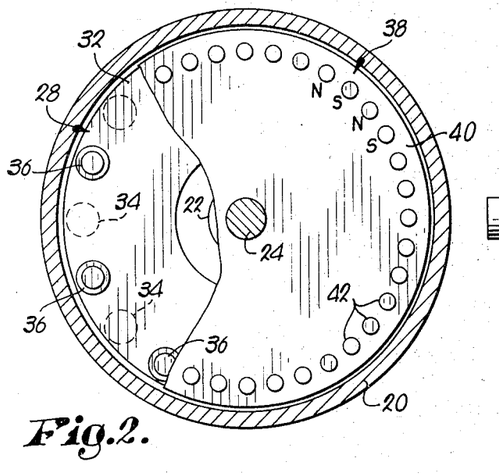
FIG. 2 is a sectional view transversely of the axis of the shaft and taken along line 2—2 of FIG. 1, the rotor unit being partially broken away to reveal one of the field assemblies.

Referring initially to FIGS. 1 and 2, a cylindrical housing 20 is relatively short in axial length and supports a pair of axially spaced bearings 22 which rotatably receive a shaft 24. A pair of field assemblies 26 and 28 are mounted within the housing 20 and include a pair of parallel, disc-like, axially spaced plates 30 and 32, respectively, composed of a nonmagnetic material. The field assembly 26 has a group of nine regularly angularly spaced electromagnets 34 arranged in a circular array and mounted on the plate 30 adjacent the circumferential periphery thereof. In similar fashion, the field assembly 28 has a group of nine electromagnets 36 in a circular array and spaced apart at regular angular intervals, as is clear in FIG. 2. For clarity of illustration, in FIG. 1 only the electromagnets 34 and 36 in the left halves of the field assemblies 26 and 28 (as viewed in FIG. 2) are shown. In FIG. 2 the electromagnets 34 are illustrated in phantom lines to reveal that the two groups of electromagnets 34 and 36 are angularly offset, the center axis of each electromagnet 34 being angularly displaced halfway between the center axes of adjacent electromagnets 36.

A rotor unit 38 is mounted on shaft 24 for rotation therewith and includes a nonmagnetic disc 40 centered between the two field assemblies 26 and 28. A series of 36 permanent magnet components 42 are carried by the disc 40 and are arranged in a circular array adjacent the circumferential periphery of the disc 40, as is clear in FIG. 2. The magnets 42 are also spaced at regular angular intervals, the diameters of the circular arrays of electromagnets 34 and 36 and permanent magnets 42 (measured from the center axes of the magnets) being equal. Adjacent permanent magnets 42 are reverse oriented so that alternate magnetic polarities are presented on each side of the disc 40 around the permanent magnet array, as indicated in FIG. 2 by the north and south polarity designations.

Figure 3:
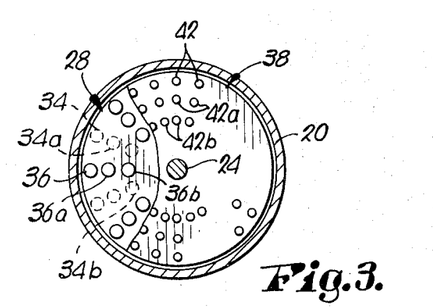
FIG. 3 is a view similar to FIG. 2 on a smaller scale illustrating a multiple magnet array configuration.

In FIG. 3 radial expansion of the electric motor of FIGS. 1 and 2 is illustrated. The construction is similar in that the housing 20, rotor unit 38, and field assemblies 26 and 28 are provided as in FIGS. 1 and 2. However, the field assembly 28 in FIG. 3 is provided with three concentric groups of electromagnets including the group 36 and two additional, radially inwardly spaced groups of electromagnets 36a and 36b. Correspondingly electromagnets of the three groups are in radial alignment, the field assembly 26 likewise having three groups of electromagnets 34, 34a and 34b illustrated in phantom lines. The electromagnets of the two field assemblies 26 and 28 are angularly offset as in the embodiment of FIGS. 1 and 2. Additionally, the rotor unit 38 now has a triple series of permanent magnets 42, 42a and 42b arranged in concentric circular arrays and aligned with corresponding electromagnet arrays of the field assemblies 26 and 28.

Figure 4:
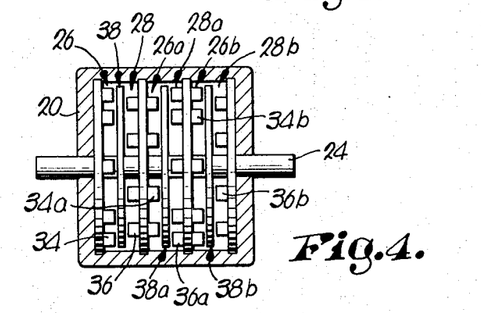
FIG. 4 is a view, partially diagrammatic, similar to FIG. 1 on a smaller scale, illustrating the addition of field assemblies and rotor units to provide an integrated, multiple section motor.

An integrated, multiple section motor is illustrated in FIG. 4 and comprises three sections arranged along the axis of the common shaft 24, the latter mounting rotor units 38, 38a and 38b for rotation in unison. Such rotor units are disposed between pairs of field assemblies 26 and 28, 26a and 28a, and 26b and 28b, respectively. The rotor units and field assemblies are identical to those shown in detail and described above with respect to FIGS. 1 and 2 with the exception that the field assemblies 28 and 26a utilize a common mounting plate for their electromagnets 36 and 34a and, similarly, the field assemblies 28a and 26b employ a common mounting plate for their electromagnets 36a and 34b. Thus, the multiple section motor of FIG. 4 is illustrative of axial expansion of the motor configuration, utilized to obtain increased power at a common mechanical output. If desired, a combination of radial and axial expansion may be employed by combining the configurations of FIGS. 3 and 4, it being apparent that the selected construction will depend upon the power output desired, together with any space considerations that might more readily accommodate the radially or the axially expanded motor.

Figure 5:
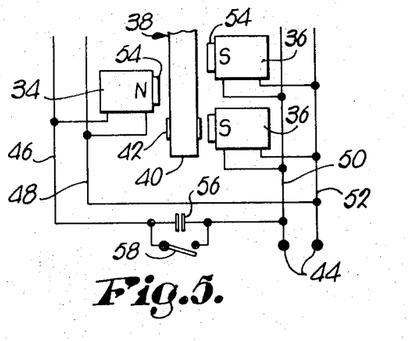
FIG. 5 is an electrical schematic and diagrammatic view showing the power circuitry to the electromagnets of the field assemblies.

FIG. 5 illustrates power circuitry to the groups of electromagnets 34 and 36, such circuitry extending from a pair of power terminals 44 from which a bidirectional electric current is obtained. The current wave shape may be sinusoidal as in conventional alternating current, but this is not required for operation of the motor. A pair of leads 46 and 48 connect the group of electromagnets 34 in parallel across the terminals 44, it being appreciated that, in the fragmentary diagram of FIG. 5, the leads 46 and 48 would extend onto the other electromagnets 34 of the group. Similarly, a pair of leads 50 and 52 connect the group of electromagnets 36 in parallel across the terminals 44. In the embodiments of FIGS. 3 and 4, the leads 46 and 48 would also be connected to the electromagnets 34a and 34b, while the leads 50 and 52 would extend to the electromagnets 36a and 36b.

Each of the electromagnets 34 and 36 in FIG. 5 is illustrated as having a core 54 projecting toward the permanent magnets 42 of the rotor unit 38 and presenting a pole face which is passed by the permanent magnets 42 as the unit 38 rotates. As indicated by the north and south notations, the pole face of each electromagnet 34 is opposite in polarity to the pole face of each of the electromagnets 36. The polarities will reverse with the cyclic reversals in the direction of current flow, a 180° phase difference between the two groups of electromagnets being maintained by the connections of the leads 46, 48 and 50, 52 to the respective electromagnet groups. Specifically, assuming that the coils of the electromagnets are all wound in the same sense, note that the interconnected leads 46 and 50 are connected to the outer and inner ends respectively of the associated electromagnets 34 and 36, the inter-connected leads 48 and 52 being connected to the inner and outer ends respectively of the coils of the associated electromagnets 34 and 36. A capacitor 56 in series with lead 46 is utilized during starting of the motor, during which time the switch 58 is open as illustrated. For synchronous operation after startup, the switch 58 is closed to short across the capacitor 56.

Figure 6:
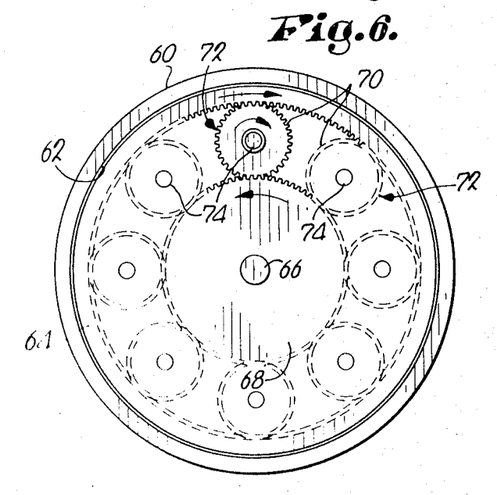
FIG. 6 is a diagrammatic, transverse cross-section illustrating a multiple motor drive assembly in which power from the individual motors is taken from outer rotating parts thereof, and further illustrates an alternative construction of the motor of FIGS. 1–5 in which the field assemblies are employed as the rotating part.
Figures 7, 10, 11, 12, 13, 14, 15, 16, 17:
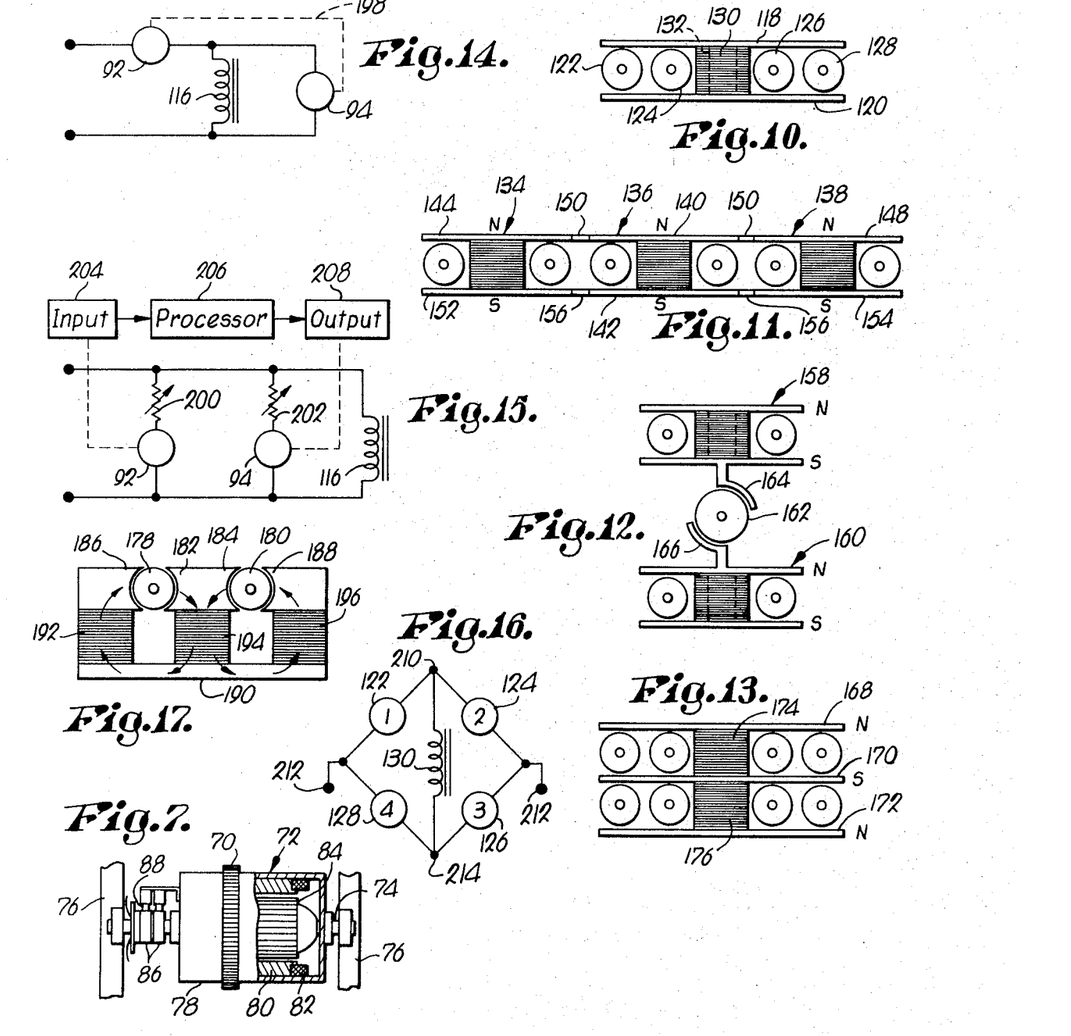
FIG. 7 illustrates a high torque motor of the concentric motor-stator type, pursuant to the teachings of the present invention.
FIG. 10 is a view similar to FIG. 9 but in diagrammatic form, illustrating expansion of the motor to a quadruple armature configuration.
FIG. 11 is a diagrammatic view showing in-line stacking of the twin armature motor configuration.
FIG. 12 is a diagrammatic view illustrating two twin armature configurations in conjunction with a single additional armature.
FIG. 13 is a diagrammatic view illustrating parallel stacking of the quadruple armature configuration of FIG. 10.
FIG. 14 is an electrical and mechanical schematic diagram of the dual armature motor configuration operated in a compound armature arrangement.
FIG. 15 is an electrical schematic diagram showing parallel armature and field winding connections to the twin armature motor utilized to obtain a dual operating characteristic, and further shows an automated processing line in block diagram form.
FIG. 16 is an electrical schematic diagram for the quadruple armature configuration of FIG. 10, utilized to obtain operating characteristics as in FIG. 15 for the twin armature configuration.
FIG. 17 is a diagrammatic view of a twin armature configuration for high torque applications.

A multiple motor drive assembly is illustrated in FIG. 6 and is particularly adapted to automobile and aircraft applications. A stationary support ring 60 has an internal bearing race 62 which rotatably supports an annular drive gear 64 for rotation about the axis of the center shaft 66. An inner drive gear 68 is rigid with the shaft 66, the inner gear 68 and the outer gear 64 having opposed sets of radially spaced gear teeth in mesh with eight pinions 70 spaced at regular intervals around the annular space between the two drive gears 64 and 68. Each of the pinions 70 is formed by gear teeth on the outer housing or frame of an electric motor 72, the shaft of the motor being maintained stationary and illustrated at 74. An exemplary individual motor 72 is shown in FIG. 7 mounted between a pair of frame members 76 to which the opposite ends of the shaft 74 are rigidly secured. The gear teeth 70 circumscribe the housing 78 of the motor 72, the housing 78 serving as a support for the field poles 80 and field windings 82 of the motor in the usual manner. A conventional slotted armature 84 is disposed within the pole structure in radially inwardly spaced relationship thereto and is excited by the field as in normal motor operation. However, the shaft 74 being fixed, the field structure and hence the housing 78 become the rotatable part of the machine from which the drive is taken. In order to provide the field windings 82 with current, a pair of slip rings 86 are provided on the shaft 74 and are in contact with a pair of brushes 88 carried by the housing 78. Manifestly, connections (not shown) are then made from the brushes 88 to windings 82.

It should be understood that the motor 72 illustrated in FIG. 7 is not limited to use in the multi-motor drive assembly of FIG. 6, in that the motor 72, of itself, is an advantageous configuration over conventional motor arrangements where the field is stationary and a rotatable armature is employed. By permitting the exciting field to rotate, higher torque is obtained over a greater speed range than obtainable with comparable stationary field machines.

It should also be understood that the synchronous, concentric motor of FIGS. 1–5 may be employed in place of the motors 72 in the drive assembly of FIG. 6. The shaft 24 would be held fixed and the housing 20 (carrying the field assemblies 26 and 28) would be permitted to rotate, the housing 20 then being provided with external gear teeth such as illustrated at 70 in FIG. 6. Furthermore, the motor of FIGS. 1–5 may be utilized as a single unit with the shaft 24 held stationary and the housing 20 forming the rotating part of the machine, as illustrated in FIG. 7 for the motor 72. Therefore, the use of the term "rotor unit" in describing the unit 38 is not to be construed in a limiting sense but is merely descriptive of the arrangement illustrated in FIGS. 1–5.

In the operation of the motor of FIGS. 1–5, switch 58 is open to start the motor, the capacitor 56 effecting a phase shift to set the phase difference between the groups of electromagnets 34 and 36 at other than 180°. The action of the capacitor 56 causes the current in the electromagnets 34 to lead the current in the electromagnets 36 with respect to an exact 180° out-of-phase relationship. Thus, the necessary rotating field is provided to effect starting of the motor. As long as the capacitor 56 is in the circuit, the speed of the rotor unit 38 will very closely approach synchronization with the frequency of the applied current, but exact synchronization will not be reached.

Upon closure of the switch 58, the speed of the rotor unit 38 increases and locks on the synchronous frequency. The starting field then becomes a part of the running circuit and a high-torque synchronous motor with large load capacity and high efficiency is provided. The motor combines the advantages of conventional synchronous and squirrel cage motors in a simplified construction, and possesses an efficiency rating capability on the order of 95 percent, well above that of either of these conventional motors. The speed of the motor of the present invention is independent of the supply voltage, and may be varied by the use of a high current, variable frequency amplifier utilizing silicon controlled rectifiers.

In the operation of the multiple motor drive assembly of FIG. 6, special attention is directed to the fact that the drive gears 64 and 68 rotate in opposite directions, being driven by the motor-pinions 70 which simultaneously rotate in the same direction. Therefore, a high speed drive is obtained from the shaft 66 while a lower speed drive is obtained from the outer drive gear 64, the two drives being in opposite directions. This is particularly advantageous in applications requiring rapid changeover from a full speed forward drive to a high power, low speed reverse drive.

FIGS. 8–17

Figure 8:
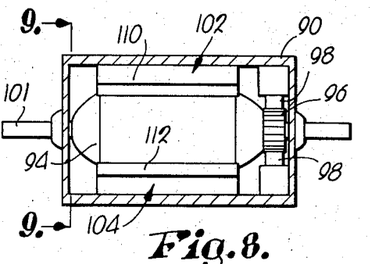
FIG. 8 is a cross-sectional view through the housing of a twin armature motor of the present invention, the operating components thereof being revealed in elevation.
Figure 9:
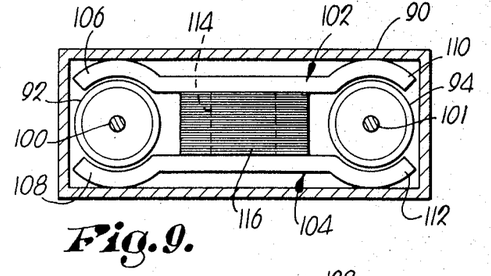
FIG. 9 is a sectional view taken along line 9—9 of FIG. 8.
Figure 18:
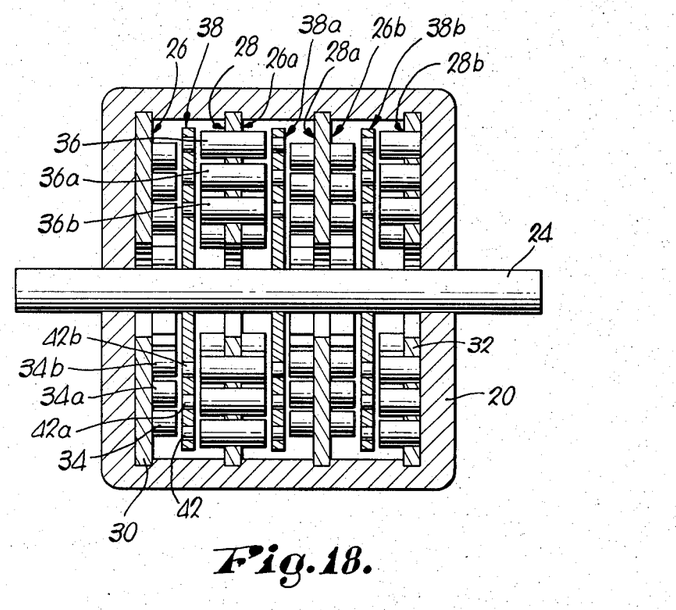

Referring to FIGS. 8 and 9, a rectangular housing 90 encases a twin armature motor having a common source of magnetic excitation for the two armatures. Specifically, the armatures are shown at 92 and 94 and are of the conventional slotted type. The motor of FIGS. 8 and 9 is a DC machine, and each armature is provided with a commutator 96 contacted by a pair of brushes 98. The armature 92 has a shaft 100 arranged in parallel with the shaft 101 of armature 94.

A pair of elongated, flat, magnetic members are broadly denoted 102 and 104 and are spaced apart in parallelism, the left ends (as viewed in FIG. 9) of the members 102 and 104 presenting a pair of spaced pole pieces 106 and 108 respectively between which the armature 92 is disposed. Likewise, the right ends of the members 102 and 104 are configured to present a pair of spaced pole pieces 110 and 112 respectively between which the armature 94 is disposed. The members 102 and 104 are bridged centrally thereof by a core 114 around which a field winding 116 is wound, the members 102 and 104 effectively being extensions of the core 114 and maintained at opposite magnetic polarities by the field winding 116.

FIG. 10 is a diagrammatic view showing expansion of the motor of FIG. 9 to a quadruple armature configuration, there being a pair of magnetic members 118 and 120 presenting four pairs of opposed pole pieces between which four rotatable armatures 122, 124, 126 and 128 are disposed. The four armatures 122–128 are excited by a common excitation source comprising a field winding 130 surrounding a core 132 bridging the members 118 and 120 intermediate the ends thereof. In the twin armature configuration of FIG. 9, the armature 92 is on one side of the field winding 116 while the other armature 94 is on the opposite side of the winding 116, this basic arrangement being evident in FIG. 10 where two of the armatures 122 and 124 are on one side of the field winding 130 while the other two armatures 126 and 128 are disposed on the opposite side thereof.

FIG. 11 diagrammatically illustrates in-line stacking of the twin armature motor configuration, three twin armature units being illustrated and designated 134, 136 and 138. Each of these units is identical to the twin motor configuration illustrated in FIGS. 8 and 9 and described above. The center unit 136 has a pair of pole members 140 and 142 of opposite polarity, the member 140 being magnetically isolated from the corresponding pole members 144 and 148 of the outside units 134 and 138 by nonmagnetic spacers 150. Similarly, the pole member 142 is magnetically isolated from corresponding pole members 152 and 154 of the outside units 134 and 138 by nonmagnetic spacers 156. Thus, the various corresponding pole members of the three units are disposed in end-to-end relationship with the nonmagnetic spacers 150 and 156 being interposed between the outer ends of the members 140 and 142 of the center unit 136 and the inner ends of the members 144, 152 and 148, 154 of the outer units 134 and 138. As indicated by the north and south notations, the same magnetic polarity is maintained for the three end-to-end members 144, 140 and 148, and the same but opposite magnetic polarity is maintained for the other three end-to-end members 152, 142 and 154.

FIG. 12 illustrates a pair of twin armature units 158 and 160 in conjunction with a fifth, single armature 162, the relative polarities of the various pole members being as indicated. An extension 164 of the south pole member of the unit 158 serves as one pole piece for the single armature 162, and an extension 166 of the north pole member of the unit 160 serves as the opposite pole piece for the armature 162, thereby driving the five armatures from two sources of magnetic excitation.

FIG. 13 illustrates parallel stacking of the quadruple armature configuration of FIG. 10. The double stack of FIG. 13 has a total of eight armatures, the four armatures of the upper section being disposed between pole members 168 and 170. The remaining four armatures comprise the lower section and are disposed between the center, common pole member 170 and a lower pole member 172. Excitation for the armatures of the upper section is delivered by a field winding 174, while excitation for the lower section is provided by a field winding 176.

FIG. 17 shows a second twin armature configuration, the armatures being designated 178 and 180. A magnetic element between the armatures 178 and 180 presents a pair of pole pieces 182 and 184 facing respective armatures 178 and 180, and a pair of pole pieces 186 and 188 opposing pole pieces 182 and 184, respectively, complete the pole configuration and direct magnetic flux into the armatures in the directions indicated by the arrows. A bar 190 of magnetic material is spaced from the pole pieces, the latter and the bar 190 being bridged by the cores of three field windings 192, 194 and 196. As may be appreciated from viewing FIG. 17, the center winding 194 is a common source of magnetic excitation for the two armatures 178 and 180, the end windings 192 and 196 being in series aiding relationship to the magnetic circuits through armatures 178 and 180, respectively. Therefore, besides the common source, each armature is energized by a separate, additional winding, this configuration providing a high intensity field for high torque in starting and operating under a heavy load.

FIG. 14 illustrates one manner in which the two armatures of the twin armature configurarion may be connected when it is desired to deliver a single output. The armature 92 is connected in series with a parallel combination of the armature 94 and field winding 116, thereby providing a compound armature arrangement. A suitable rotative mechanical interconnection between the two armatures 92 and 94 is diagrammatically illustrated at 198 and may, for example, comprise a belt and pulley assembly.

For dual output from the twin armature configuration in control system applications, the circuit connections of FIG. 15 are utilized to place the armatures 92 and 94 in parallel with the field winding 116. Variable resistors 200 and 202 are shown in series with respective armatures 92 and 94 for speed control purposes. As an example of a possible control application, the armatures 92 and 94 are shown coupled to an automated processing line having an input section 204 driven by the armature 92, a processing section 206, and an output section 208 driven by the armature 94. The function of the processing section 206 may, for example, be the mixing of ingredients fed thereto by the input section 204 and delivered from the processing section 206 by the output or delivery section 208.

FIG. 16 illustrates supply circuit connections for the quadruple armature configuration of FIG. 10 for control applications as discussed above with respect to FIG. 15 and the twin armature configuration. It is apparent that the two armatures 122 and 124 are connected in series at a junction point 210, the series combination being connected across the supply terminals 212. The two other armatures 126 and 128 are likewise connected in series at a junction point 214, the series combination being connected across the supply terminals 212. The field winding 130 is connected between the junction points 210 and 214. In this arrangement, the armatures 122 and 124 operate together, as do the armatures 126 and 128.

In the operation of the twin armature motor with the armatures and field winding connected in accordance with FIG. 14, the armatures are mechanically interconnected as discussed above and as indicated at 198. The operating circuitry of FIG. 14 may be employed with the configuration of FIGS. 8 and 9 as well as the modified twin armature configuration of FIG. 17. Manifestly, the individual twin armature units 134, 136, 138, 158 and 160 would each be connected in accordance with FIG. 14 for optimum single output operation of each unit. The compound armature arrangement of FIG. 14 combines the features of series and shunt operation, in that both high starting torque without danger of excessive armature current plus constant speed throughout wide load variations are obtained.

The electrical arrangement of FIG. 14 may be expanded to quadruple armature units and units with a still greater number of armatures. In the motor illustrated in FIG. 10, for example, both armatures 126 and 128 would be connected in parallel with each other and with the field winding 130, the other two armatures 122 and 124 then being connected in series with the parallel combination. All of the armature shafts would be interconnected for rotation in unison to provide a common output. Manifestly, the addition of more armatures to the configuration would result in all armatures on the right (as viewed in FIG. 10) of field winding 130 being connected in parallel therewith, the left hand armatures being serially connected with such parallel combination.

Utilizing the armature and field arrangement of FIG. 15, a multiple output is obtained having unique characteristics. To illustrate, it is assumed that the armature 92 is loaded while the other armature 94 is allowed to run with little or no load. The unloaded armature 94 will rotate at a higher rpm, increasing in speed at the rate the armature 92 decreases in speed with an increase in its load. In other words, one of the armatures varies in speed inversely with changes in the speed of the other armature, and vice versa. This two way action is achieved in the twin armature configuration of both FIGS. 8 and 9 and FIG. 17, in which latter case the common field winding 194 would be connected in parallel with the series combination of armature 178 and winding 192, and a series combination of armature 180 and winding 196.

From a study of FIG. 9, for example, it may be appreciated that the common field winding 116 for the two armatures establishes parallel magnetic circuits through the pairs of pole pieces 106, 108 and 110, 112 by virtue of the arrangement of the magnetic members 102 and 104. Thus, each armature is independently excited, the two armatures 92 and 94 thereby constituting parallel reluctances between the pairs of pole pieces, each such reluctance being subject to variation in accordance with armature speed or load changes. Therefore, the inverse speed variation characteristic discussed above is obtained. However, at a critical speed of rotation of the less loaded, higher speed armature of the pair, the external field exciting the faster armature is largely cancelled and most of the field shifts to the loaded armature, increasing its load capacity accordingly. The armature field (due to counter electromotive force) generated by the unloaded armature increases as the armature reaches the critical rpm, thus the external, exciting field across the loaded armature is effectively increased to maximum. This action occurs at saturation of the unloaded armature. At this point, the load may be increased over a wide range without further decreasing the speed of the loaded armature. Additionally, the speed of the faster, less loaded armature also remains constant. Thus, a dual operational characteristic is obtained, either characteristic being selectively utilizable depending upon the particular application.

When the motor is operated with the lesser loaded armature under its critical speed, the inverse variation characteristic discussed above is linear and is thus quite useful in control system applications. For example, FIG. 15 illustrates linear reverse feedback in that an increase in the load presented by the input section 204 of the automated line, resulting in a corresponding decrease in the speed of the armature 92, causes the armature 94 to increase its speed and drive the output section 208 faster. Thus, in a processing line, the input and output sections automatically increase or decrease in speed to maintain the rate of operation of the processing section 206 essentially constant. It may be appreciated that a distinct advantage of the motor is that it eliminates the delay inherent in signal feedback arrangements utilized in conventional servo controls. Manifestly, the illustration in FIG. 15 is only one possible example of the application of the motor to control systems, a multitude of different arrangements being possible depending upon the particular system requirements. In this respect, the stacked arrangements of FIGS. 11 and 13 may be advantageously utilized in more complex systems.

The circuitry of FIG. 16 is utilized with the quadruple armature motor of FIG. 10 or with an individual section of the stacked motor of FIG. 13. The operational characteristics obtained are the same as discussed above with respect to FIG. 15, except armatures 122 and 124 operate together, as do armatures 126 and 128. For example, if the speed of armature 122 decreases, the speed of armature 124 likewise decreases and the speeds of the armatures 126 and 128 correspondingly increase. The same linear inverse variation characteristic is obtained as discussed above, until the lesser loaded armature pair reaches a critical rpm. It may be appreciated that the additional outputs provided by the quadruple configuration or the stacked arrangements may be advantageously utilized in complex control applications. Furthermore, in order to obtain linear positive feedback rather than negative feedback as illustrated in FIGS. 15 and 16, two multi-armature motors may be employed using one motor in the input and the other in the output stage, with the control sections thereof connected either mechanically or electrically. As an example of this, in FIG. 11 the two adjacent armatures of the units 134 and 136 could be mechanically interconnected for rotation in unison so that a variation in the speed of the outer armature of the unit 134 causes a corresponding variation in the speed of the other armature of the unit 136, such variations being in the same direction of change.

We claim:

1. Electric motor apparatus comprising:

a pair of mechanical machine elements provided with means operably associated therewith for supporting the elements for relative rotation therebetween about a mutual axis thereof;

a pair of generally circular field assemblies mounted upon one of said elements in fixed, spaced apart, opposed relationship to each other and with the axes thereof substantially aligned with said axis of relative rotation of said elements, each of said assemblies including a plurality of electromagnets, each of said electromagnets having an electromagnetic core provided with a pole face thereon, and a coil operably associated with said core for appreciably magnetizing the latter only when said coil is being electrically energized, one of said assemblies further including means holding said plurality of electromagnets of said one assembly with said pole faces of said cores thereof substantially coplanar with each other, facing toward the other of said assemblies, and spaced from each other at substantially equal angular intervals around a substantially annular array thereof substantially concentric to said axis of relative rotation of said elements, the other of said assemblies further including means holding said plurality of electromagnets of said other assembly with said pole faces of said cores thereof substantially coplanar with each other, facing toward said one assembly, and spaced from each other at substantially equal angular intervals around a substantially annular array thereof substantially concentric to said axis of relative rotation of said elements and of substantially the same radius as said array of said one assembly, whereby said arrays of said assemblies are juxtaposed in spaced apart opposition to each other;

a generally circular armature unit between said assemblies and mounted upon the other of said elements with the axis thereof substantially aligned with said axis of relative rotation of said elements, said unit including a plurality of straight permanent magnets, each of said magnets having an axis and a pole face at each axial extremity thereof, said pole faces of each magnet facing away from each other and being respectively magnetized with opposite magnetic polarities, said unit further including means holding said magnets with said axes thereof substantially parallel to said axis of relative rotation of said elements, said pole faces at one extremity of said magnets substantially coplanar with each other and facing toward said one assembly, said pole faces at the other extremity of said magnets substantially coplanar with each other and facing toward said other assembly, and said magnets spaced from each other at substantially equal angular intervals around a substantially annular array thereof substantially concentric to said axis of relative rotation of said elements and of substantially the same radius as said arrays of said assemblies, whereby the pole faces of said array of magnets at each extremity of the latter respectively are juxtaposed in spaced but proximate opposition to said array of pole faces of the corresponding assembly, said magnets in said array thereof being alternatively oppositely oriented magnetically, whereby successive similarly facing pole faces around said array of magnets at each extremity of the latter are of alternately opposite magnetic polarities; and circuit means electrically coupled with said coils of said electromagnets of each of said assemblies and adapted for electrical coupling with a source of continuously alternating, bidirectional electric power for continuously energizing said coils of said one assembly in phase with each other to electromagnetize said cores of said one assembly with like instantaneous but changing polarity and for continuously energizing said coils of said other assembly in phase with each other but out of phase with said coils of said one assembly to electromagnetize said cores of said other assembly with like instantaneous but changing polarity opposite to that of said cores of said one assembly.

2. The apparatus of claim 1, wherein said pole faces of said array of said other assembly are equal in number to said pole faces of said array of said one assembly.

3. The apparatus of claim 2, wherein said pole faces of said array of said other assembly are respectively angularly offset from said pole faces of said array of said one assembly by approximately one-half the angular spacing between adjacent pole faces in said array of either of said assemblies.

4. The apparatus of claim 3, wherein there are a greater number of said magnets than there are said electromagnets in either of said assemblies.

5. The apparatus of claim 1, wherein said one element includes a housing, and said other element includes a shaft rotatably journalled in said housing.

6. The apparatus of claim 5, wherein said one element and said assemblies comprise a stator, and said other element and said unit comprise a rotor.

7. Electric motor apparatus comprising:

a pair of mechanical machine elements provided with means operably associated therewith for supporting the elements for relative rotation therebetween about a mutual axis thereof;

a pair of generally circular field assemblies mounted upon one of said elements in fixed, spaced apart, opposed relationship to each other and with the axes thereof substantially aligned with said axis of relative rotation of said elements, each of said assemblies including a plurality of electromagnets, each of said electromagnets having an electromagnetic core provided with a pole face thereon, and a coil operably associated with said core for appreciably magnetizing the latter only when said coil is being electrically energized, one of said assemblies further including means holding said plurality of electromagnets of said one assembly with said pole faces of said cores thereof substantially coplanar with each other, facing toward the other of said assemblies, and spaced from each other at substantially equal angular intervals around a plurality of substantially annular arrays thereof of differing radii substantially concentric to said axis of relative rotation of said elements, the other of said assemblies further including means holding said plurality of electromagnets of said other assembly with said pole faces of said cores thereof substantially coplanar with each other, facing toward said one assembly, and spaced from each other at substantially equal angular intervals around a plurality of substantially annular arrays thereof of differing radii substantially concentric to said axis of relative rotation of said elements and of equal number and substantially the same radii as said arrays of said one assembly, whereby corresponding arrays of said assemblies are juxtaposed in spaced apart opposition to each other;

a generally circular armature unit between said assemblies and mounted upon the other of said elements with the axis thereof substantially aligned with said axis of relative rotation of said elements, said unit including a plurality of straight permanent magnets, each of said magnets having an axis and a pole face at each axial extremity thereof, said pole faces of each magnet facing away from each other and being respectively magnetized with opposite magnetic polarities, said unit further including means holding said magnets with said axes thereof substantially parallel to said axis of relative rotation of said elements, said pole faces at one extremity of said magnets substantially coplanar with each other and facing toward said one assembly, said pole faces at the other extremity of said magnets substantially coplanar with each other and facing toward said other assembly, and said magnets spaced from each other at substantially equal angular intervals around a plurality of substantially annular arrays thereof of differing radii substantially concentric to said axis of relative rotation of said elements and of equal number and substantially the same radii as said arrays of said respective assemblies, whereby the pole faces of each of said arrays of magnets at each extremity of the latter respectively are juxtaposed in spaced but proximate opposition to the corresponding arrays of pole faces of the corresponding assembly, said magnets in each of said arrays thereof being alternately oppositely oriented magnetically, whereby successive similarly facing pole faces around each said array of magnets at each extremity of the latter are of alternately opposite magnetic polarities; and circuit means electrically coupled with said coils of said electromagnets of each of said assemblies and adapted for electrical coupling with a source of continuously alternating, bidirectional electric power for continuously energizing said coils of each respective array of said one assembly in phase with each other to electromagnetize said cores of that array of said one assembly with like instantaneous but changing polarity and for continuously energizing said coils of each respective corresponding array of said other assembly in phase with each other but out of phase with said coils of the corresponding array of said one assembly to electromagnetize said cores of that array of said other assembly with like instantaneous but changing polarity opposite to that of said cores of the corresponding array of said one assembly.

8. The apparatus of claim 7, wherein said pole faces of each of said arrays of said other assembly are equal in number to said pole faces of the corresponding array of said one assembly; and said pole faces of each of said arrays of said other assembly are respectively angularly offset from said pole faces of the corresponding array of said one assembly by approximately one-half the angular spacing between adjacent pole pieces in said corresponding arrays of either of said assemblies.

* * * * *